United States Patent
Scarnato et al.

[15] 3,673,779
[45] July 4, 1972

[54] HARVESTING MACHINE

[72] Inventors: Thomas J. Scarnato, Barrington; Paul C. Grodon, Hinsdale; Stephen R. Hunter, Downers Grove; Paul W. Krage, Elmhurst; Richard A. Zablocki, Chicago, all of Ill.

[73] Assignee: International Harvester Company, Chicago, Ill.

[22] Filed: April 23, 1970

[21] Appl. No.: 31,111

[52] U.S. Cl. .......................................... 56/503, 56/DIG. 1
[51] Int. Cl. .............................................. A01d 49/00
[58] Field of Search .................. 56/DIG. 1, 503, 192, 14.5, 56/14.4, 14.1, 14.3, 12.3, 10.2, 11.9

[56] References Cited

UNITED STATES PATENTS

| | | | |
|---|---|---|---|
| 2,634,569 | 4/1953 | Raney et al. | 56/14.3 |
| 2,648,943 | 8/1953 | Shafer et al. | 56/DIG. 1 |
| 3,090,188 | 5/1963 | Gorham | 56/503 |
| 3,455,094 | 7/1969 | Gorham | 56/503 |
| 3,391,522 | 7/1968 | Zweegers | 56/6 |
| 3,443,369 | 5/1969 | Zweegers | 56/6 |
| 3,513,647 | 5/1970 | Johnston et al. | 56/14.5 |
| 3,524,306 | 8/1970 | Reber | 56/12.3 |
| 3,523,410 | 8/1970 | Taylor et al. | 56/10.2 |
| 3,469,378 | 9/1969 | Heesters et al. | 56/11.9 |

FOREIGN PATENTS OR APPLICATIONS

| | | | |
|---|---|---|---|
| 436,820 | 11/1967 | Switzerland | 56/13.7 |
| 1,520,475 | 3/1968 | France | 56/DIG. 1 |
| 1,140,284 | 1/1969 | Great Britain | 56/13.8 |
| 1,578,285 | 7/1969 | France | 56/DIG. 1 |
| 1,507,224 | 12/1969 | Germany | 56/DIG. 1 |

*Primary Examiner*—Russell R. Kinsey
*Attorney*—Floyd B. Harman

[57] ABSTRACT

A mower conditioner comprising disk-type mowers ahead of the conditioning rollers functioning to cut and throw the material directly to the conditioning rollers. Another embodiment utilizes disks which provide unobstructed top surfaces which serve to accept the material and to sling the material rearwardly into the conditioning rollers.

19 Claims, 6 Drawing Figures

INVENTORS
Thomas J. Scarnato
Paul C. Gordon
Stephen R. Hunter
Paul W. Krage
Richard A. Zablocki
BY John J. Kowalik ATT)

PATENTED JUL 4 1972 3,673,779

INVENTORS
Thomas J. Scarnato
Paul C. Gordon
Stephen R. Hunter
Paul W. Krage
Richard A. Zablocki BY John J. Kowalik ATTY.

3,673,779

HARVESTING MACHINE

BACKGROUND OF THE INVENTION

In prior art devices mower conditioners comprised sickle type mowers. These mowers have serious limitations in that they present various problems in cutting downed or matted crops or crops of rank growth particularly where such growth is in decayed vegetation. Further in most such devices a reel is required to convey the material from the mower to the hay conditioning rolls, the reel serving as the sole conveying means. Therefore the number of tine bars on the reel, the construction thereof, as well as the speed of the reel is critical in maintaining the proper flow of the material without bunching or plugging.

SUMMARY OF THE INVENTION

This invention is concerned with harvesting machines of the type commonly known as mower-conditioners.

The general object of the invention is to provide a harvesting machine of the mower conditioner type wherein an improved cutting and conveying mechanism is provided.

A further object of the invention is to provide a novel arrangement of mowing means in the form of disks or drum type cutters which in several of the embodiments serve as the sole means for cutting and conveying the cut material into the crushing rolls thus eliminating the ponderous, expensive and heavy reel.

An object in one of the embodiments is to provide a novel cutting mechanism of the disk type in which the disks provide a support for the cut crops and function to sling the cut crops into the hay conditioning rollers with a fanning effect to spread the material along substantially the entire lengths of the rollers.

A different object of the invention is to provide a novel harvester of the mower conditioner type wherein the cutting comprise drums which are provided with means for gathering the material between adjacent drums which rotate in converging relationship for grasping the material and then throwing the material with horizontal fanning effect into the hay conditioning rollers which are disposed in the trajectory of the material being discharged by the cutting means.

A still further object of the invention is to provide a novel cutting mechanism for a mower conditioner in the form of a plurality of disks with unobstructed upper surfaces the disks serving as depositories for the cut material and rotating at such velocities as to fling the material off tangentially rearwardly into the conditioning mechanism.

One of the principal objects of the invention is to provide a novel simplified and improved harvester of the mower conditioner type.

These and other objects and advantages inherent in and encompassed by the invention will become more apparent from the specification and drawings wherein.

Figure 2:
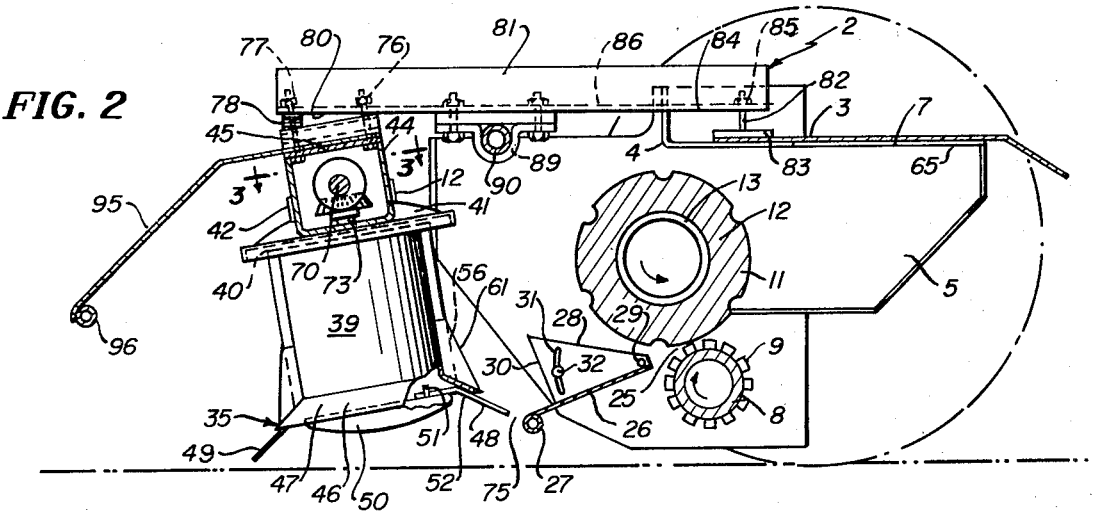
FIG. 2 is a longitudinal vertical cross sectional view taken substantially on the line 2—2 of FIG. 1.
Figure 4:
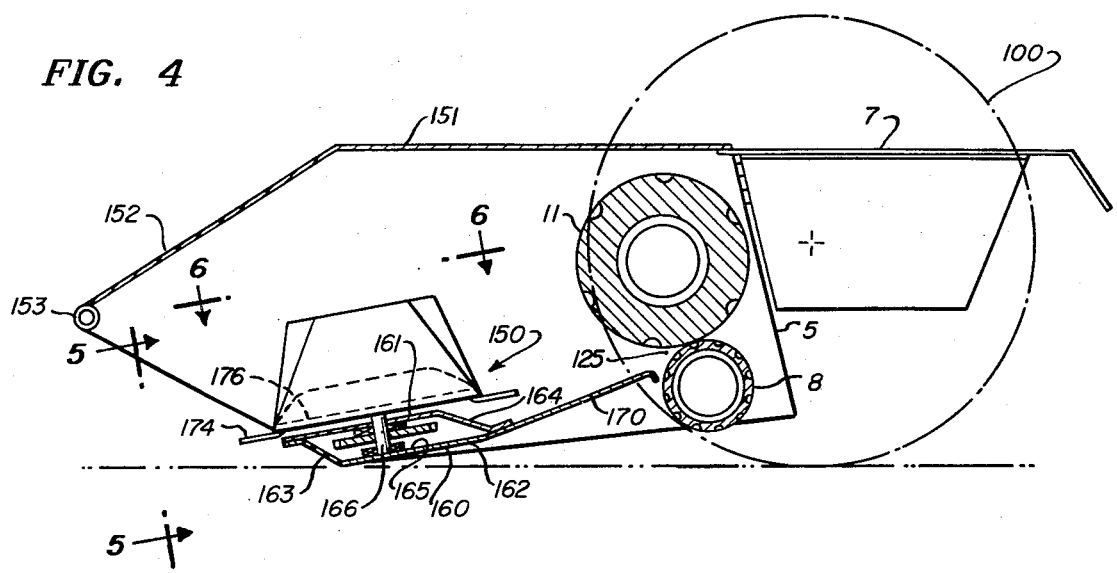
Figure 5:
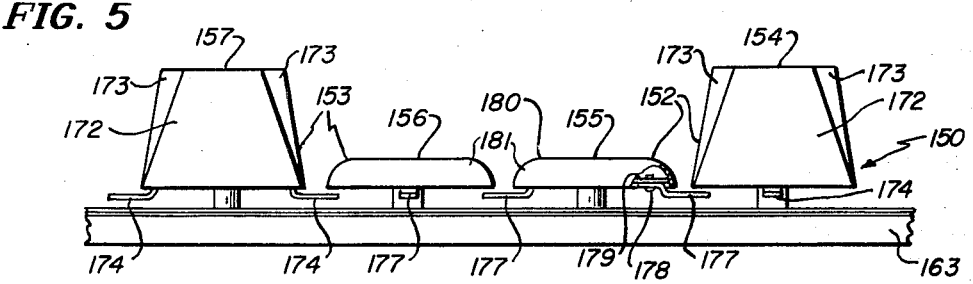
Figure 6:
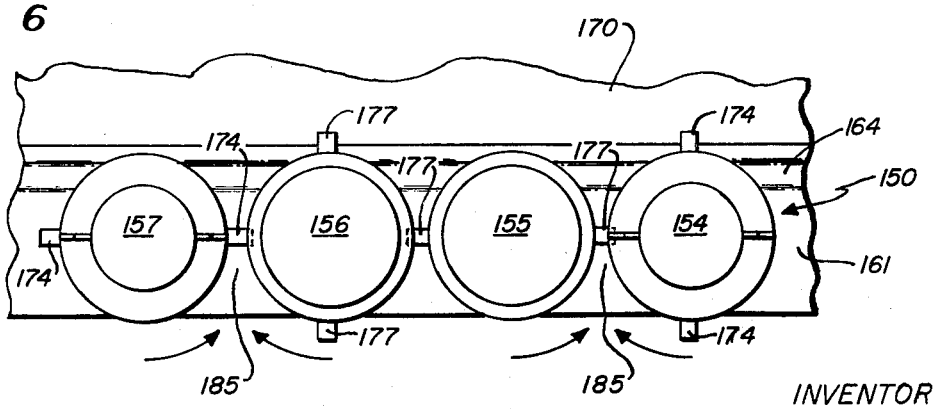

FIGS. 4, 5, and 6 illustrate a second embodiment to the invention, FIG. 4 being of a section comparable to that of FIG. 2, FIG. 5 being a front view taken substantially on the line 5—5 of FIG. 4 illustrating the arrangement of the cutting means and FIG. 6 being a top plan view taken substantially on the line 6—6 of FIG. 4.

DESCRIPTION OF THE EMBODIMENT OF FIGS. 1 THROUGH 3

The harvester or mower conditioner device generally designated 2 comprises a frame structure generally indicated 3 which comprises a transverse beam member 4 connected to vertical side plate structures 5 at each end. These plate structures 5,5 are interconnected by a transverse deflector plate 7. A lower hay conditioning roller 8, which may comprise a center core with a series of axial ribs 9 thereon, has stub axles at each end mounted on fixed journals 10, the journals or bearings being mounted on the respective side plate frame elements 5. The lower roller cooperates with an upper roller 11 which has its axis in rotation disposed forwardly and upwardly with respect to the axis of rotation of the roller 8 and may comprise a body of elastomer material 12. It will be appreciated that both rollers 8 and 11 may be of any material whatsoever and that configurations for the purposes of the present invention are not critical as such and any roller well known in the art may be substituted for those herein described.

The upper roller 11 has its body 12 connected to a center core 13 which at each end 14 comprises a shaft journalled in a journal 15 which is carried from a lever arm 16 intermediate the ends thereof, the rear end of the lever arm being pivoted as at 17 to bracket structure 18 connected to the associated side frame member 5 and the forward end of the lever being connected as at 17' to the lower end of the spring assembly 18' which is arranged with the lever 16 in a toggle arrangement. The spring assembly 18' has a pivotal mounting at 19 to front portion 20 of the said frame element 5. The toggle assembly, 16 and 18', thus urges the roller downwardly and thus the roller 11 into cooperative engagement or cooperation relationship with the roller 8. The lever 16 is provided with a stop 22 which cooperates with a stop 23 on the frame element 5 in order to limit the movement of the roller 11 toward the roller 8 as well known to those skilled in the art.

The rollers 8 and 11 define a downwardly and forwardly facing intake nip 25 which is in alignment with an upwardly and rearwardly inclined guide plate or platform 26 which at its forward end is provided with a tubular reinforcing tube or structure 27 and at each lateral edge is provided with an upstanding wall 28, each wall 28 being pivoted as at 29 by means of a suitable nut and bolt assembly to the associated plate 5 adjacent to the rear end of the wall 28. Each wall 28 is provided adjacent to its forward edge 30 with arcuate slot 31 its curvature being struck from the pivot 29 whereby it is concentric therewith. The slot 31 admits a nut and bolt assembly 32 therethrough which also extends through the related side plate. Thus upon loosening of the bolts 32 at each end of the platform plate assembly 26, the same may be swung vertically about the pivot bolts 29 at each end and adjusted in optimum position to feed the material which is being cut by the rotary mowing devices generally designated 35 positioned thereahead.

Figure 3:
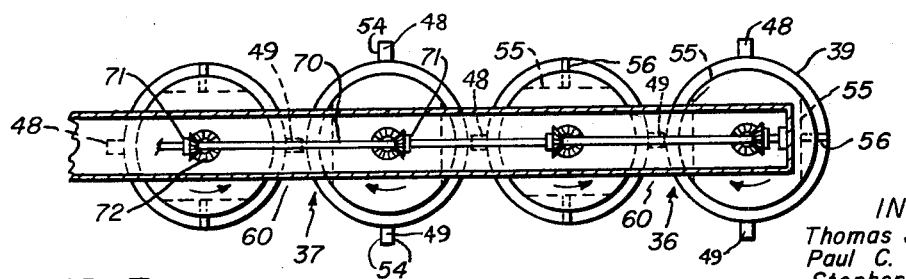
FIG. 3 is a sectional view taken substantially on the line 3—3 of FIG. 2.

The rotary mowing devices of the present embodiment comprise the plurality of pairs of drums 36 and 37. Each drum comprises a generally cylindrical relatively large diameter body 39 which at its upper edge 40 fits under or into bottom concavity of a concavo-convex cover 41 said cover being suitably fastened as by welding to a transverse beam 45 by means of tabs or lugs 42 extending upwardly from the top of the cap 41 and embracing opposite sides of the front and rear walls 43 and 44 of the box section support beam 45. The lower end of the cylindrical body 39 is connected to the frusto pyramidal shield or shroud 46 which provides a downwardly sloping frustoconical surface 47 for shedding the crop materials which are cut by diametrically oppositely extending knife blades 48, 49. Shroud 46 together with the bottom cap 50, which is suitably releasably secured to the drum or cylinder 39, confine the blades 48, 49. Each blade 48 is pivotally mounted at its inner end on an upstanding pin 51 which is secured to the upper side of the bottom cover. The blades 48 each have an outer end portion 52 which extend downwardly and outwardly generally parallel with the slope of the upper surface 47 of the shroud 46. These blades have sharpened lateral edges 54, 54 and are extended radially outwardly of the respective rotor by a centrifugal force. Each drum 39 has diametrically opposite chordal walls 55 and centered on these walls are vertical paddles or fins 56 suitably connected such as by welding or bolting to the respective wall 55 and to the top of the shroud 46. These paddles are effective to sling the material from the respective drums 39. The drums of each pair 36 and 37 are disposed or timed as best seen in FIG. 3 whereby the paddles 56 of one drum of each pair are adapted to align transversely of the line of cutting with the knives 48 of the other drum. Thus any material which is being cut by the one drum of each pair and being carried into the convergence 60 of the pair of drums is being flung rearwardly not only by the knife but also by the opposed paddle. It will be noted that each paddle is a somewhat triangular member and its outer edge 61 slopes upwardly toward the drum whereby the paddle or the slinger 56 is substantially wider at its lower end which is at the shroud surface 47 and progressively becomes narrower. This minimizes the power requirements in that the fanning effect is minimized and the most effective portion of the paddle 56 is located in the zone of accumulation of the crops.

It will be noted that the drums are disposed at an inclination to the vertical in that they are tipped forwardly at their upper ends and that the knife blades or the tips of the knife blades sweep in a plane which generally parallels the plane of the top surface of the plate 26 whereby the material is caused to slide up the platform or ramp 26 and into the nip 25 between the rollers which are driven in the direction of the arrows as seen in FIG. 2, is well known to those skilled in the art and this shows the material in a high velocity stream against the under surface 65 of deflector plate 7 and redirected thereby downwardly into a windrow between the windrower shields 66 which are carried from the shield 7 at opposite sides thereof in rearwardly converging relationship is well known to those skilled in the art.

It will be observed that the cutters each carried on the common beam 45 which serve as a housing for a power transmission or drive shaft 70 which is connected to a plurality of beveled gears 71 meshing with gears 72 which are connected to countershafts 73 of the respective drums 39. It will be observed that the arrangement of the gears 71, 72 is such that the pair of drums 37 rotate in opposite direction as shown by the arrows similarly the drums 36 also rotate in opposite directions which converge toward the bight or convergence area 60. These cutters, while moving the material therebetween, sling the material rearwardly across the jump gap 75 between the rear edge of the sweep of the knives 48 and the front end 27 of the guide 26.

It will be observed that the drums 39 are adjustably mounted by means of nut and bolt assemblies 76 and 77 by adding or removing washers from the stack of washers at 78 or shims or adjusting members between the top mounting blocks 79 and the underside 80 of the hanger members 81 at their forward ends. The relative inclination of the cutter assembly to the ground is between 5° and 20° and has been found optimum in the range of about 5° to 10° with respect to the ground. The cutter assembly is adjustable in entirety by the adjusting bolts 82 which have their lower ends fixed to the transverse beam member 83 of the framework bolts 82 extending through a loose opening in the horizontal web 84 of the support or adjusting beam 81 and at their upper ends having a nut 85 threaded thereon, the nut 85 bearing against the top side 86 of the wall 84 and upon being screwed down on the shank of the respective bolt 82 causes the rear end 87 of the associated beam to move downwardly and the front end upwardly since the beam 81 is rockably mounted intermediate its ends by means of a clamp 89 about a transverse axle shaft or rockshaft 90, said clamp 89 being bolted to the respective beam 81 via the web 86 intermediate the ends thereof. The adjustment of the adjusting means or the bolts 82 will effect up and down adjustment on the front end of the front ends 92 of the respective beams 81 and will thereby move the entire cutter assembly up and down.

The beam structure 45 carries a forwardly and downwardly projecting combination safety cover and crop bending or break bar structure 95 which at its forward edge is provided with transverse bar or pipe 96 to form a smooth contour to prevent crops from being hung on the bar and to gently fold them under the cover. The ends 97 of the bar 96 are curved rearwardly to provide guides for guiding the crop material away from the sides of the machine.

The harvesting mechanism heretofore described is carried at each end by a wheel member 100 which is mounted on the rear end of a downwardly and rearwardly extending extensible and adjustable arm 101 which at its forward end is connected to the adjacent end of the transverse rockshaft 90, the rockshaft 90 being journalled to the frame and connected to a suitable lever arm 102 intermediate its ends which may be connected to one end of a jack screw member 103 operated by handle 104 as is well known to those skilled in the art, the jack screw being connected to a bracket 105 which is fixed to the framework 2 of the unit. By retracting the jack, the wheels swing downwardly and lift the unit and by extending the jack the wheels swing upwardly and lower the unit which is provided at its forward end with a 3-point hitch 107 adapted for connection to the conventional tractor hitch structure (not shown) while the power input shaft 108 is connected to the usual power take-off shaft of the tractor. The unit mounted on the tractor via the 3-point hitch structure is also adapted to be lifted about a fore and aft pivot 109 connected to the outer end of a transverse coupling arm or reach structure 110 which in turn is pivotally mounted on the draft frame hitch structure 107. The lifting and lowering of the unit about axis 109 is accomplished by means of a hydraulic ram or cylinder and piston arrangement 111 which is mounted on the frame structure 107 and pivotally connected as at 112 to the inboard ends of a pair of lift links or straps 113 which in turn are connected to a lift lever 114 intermediate the ends thereof as by a pin at 115, the lever 114 being pivoted at its lower end as at 116 into the reach structure 110 and at its upper end as at 117 to the inboard end of a pull rod 118 which at its outboard end is connected to the top side of the outboard end of the frame member 45. A counterbalance spring arrangement 120 is provided between the ram and the lever 114 and the connection at 115 is in the nature of a lost motion in that slots are provided in the straps or links 113 into which extend in the pins 115 whereby the springs which are elongated and generally parallel to the length of the slots will expand and contract pursuant to the floating movements of the harvesting unit.

The drive for the conditioning rollers is essentially as shown in U.S. Pat. No. 3,039,256.

DESCRIPTION OF THE EMBODIMENT OF FIGS. 4 THROUGH 6

Figure 1:
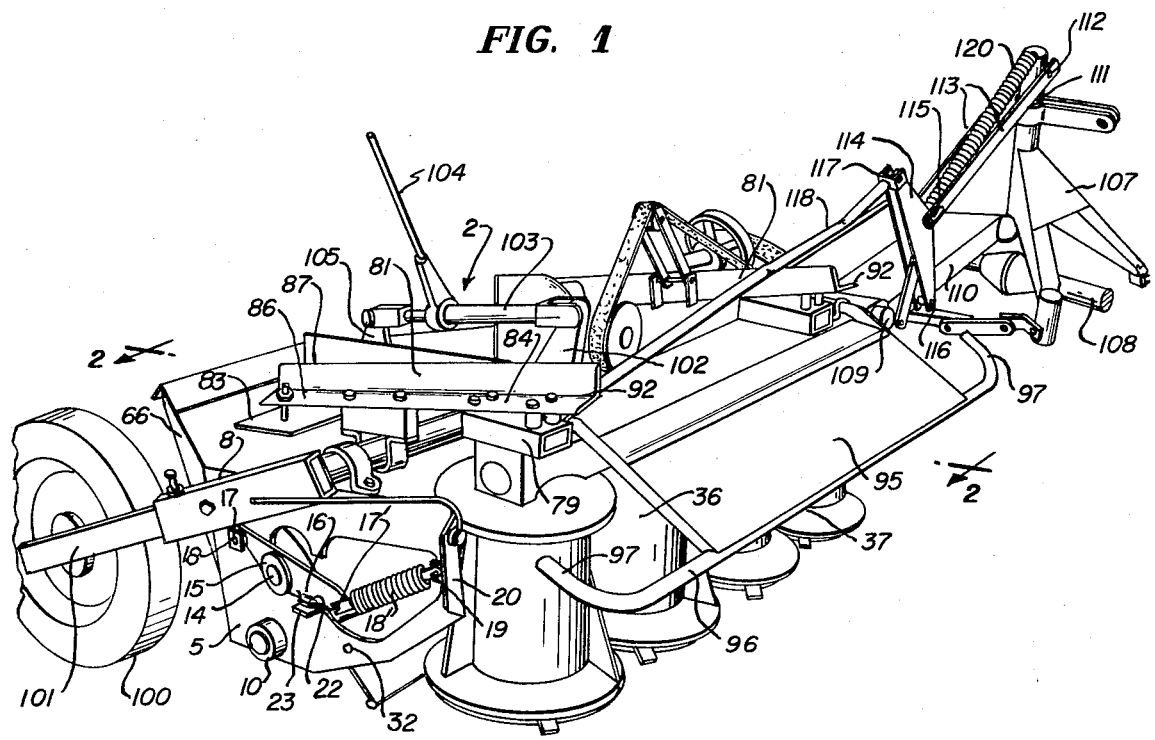
FIG. 1 is a perspective view of one form of the invention.

The structure of this embodiment of the invention is essentially the same as in FIGS. 1 through 3 insofar as the wheels 100 and rollers 8 and 11 and the mounting on the side members 5 are concerned and their relationship to each other and to the overlying fluffer and windrowing structure 7. In this embodiment the side panels 5 extend forwardly and flank the disc mowing means generally designated 150. An integral cover 151 and a downwardly and forwardly sloping front shield 152 interconnects the side panels and the shield 152 terminates in prostrating or bend bar 153 which functions and is in accord with the element 96 heretofore described in connection with FIG. 1 and therefore parts which are common to those of the previous embodiment are identified with the same reference numeral. In the present instance the disks or cutters are also arranged in pairs 152, 153 and constituted by rotors 154 and 155 and 156 and 157 respectively. The forward end of the unit is formed as essentially in box section beam structure 160 comprising top and bottom webs 161 and 162 and diagonal sloping front and rear walls 163 and 164 which form a housing compartment 165 in which there are mounted a plurality of gears 166 on upright spindles suitably mounted in appropriate bearings between and to the top and bottom walls 161 and 162. The arrangement of the gears for driving the respective units in the direction shown in FIG. 6 is well known in the art and shall not be described in further detail. In the present instance the web or wall 162 is integral with an upwardly and rearwardly sloping platform or guide wall 170 which extends diagonally upwardly rearwardly and terminates at the nip 25 established between the rollers 8 and 11. In the present embodiment the disk rotary cutters 154 and 157 are of substantially identical construction and the rotors 155 and 156 are essentially identical. Each member 154 and 157 has an upwardly tapered conical or frusto conical drum 172 which has a pair of radially outwardly extending diametrically opposite paddles 173, 173 secured thereto either by welding or suitable bolting. Each paddle widens upwardly and the paddles 173, 173 of each drum 172 are in axial alignment with the diametrically opposed swinging cutter blades 174, 174 suitably pivotally connected to the bottom plate 176 of the respective drum structure for pivotal movement about upright axes and being swingable outwardly pursuant to centrifugal force due to rotation of the respective cutters. The rotors 155, 156 as heretofore stated are of identical construction and each comprise a pair of radially outwardly swinging diametrically opposed blades 177 which at their inner ends are pivoted on vertical pins 178 suitably secured to a bottom plate 179 of the respective cutter. The cutters 155 and 156 each comprise an inverted dome shaped cover 180 which has a flat top surface 181 and downwardly curved skirt portion 181. These crop receiving areas 181 provide unobstructed surfaces for accommodating material thereon as the same may be slung upwardly and rearwardly either by the deflecting cutter blades 177 or by the paddles 173 of the companion cutter. It will be noted that the pairs of cutters rotate on their forward sides toward each other and accumulate the material in the area of convergence or the throat 185 therebetween and the material is then forcibly ejected with a slinging action into the nip 25 of the hay conditioning rollers therebehind said rollers being in position substantially horizontally.

In operation in either device that in FIGS. 1 through 3 or 4 through 6 the rotary cutters are adapted to cut the material adjacent to the ground determined by the positioning of the height of the unit and/or the adjustment of the cutters of the embodiment of FIGS. 1 through 3 and the material is then cut and is discharged rearwardly up the respective ramp 170 or 26 directly into the nip of the rollers whereat it discharges against the underside of the fluffing panel or plate and converged between the side sheets of the windrowing mechanism well known to those skilled in the art whereupon the material is deposited on the ground in the windrow. It will be noted in this embodiment as in the previous embodiment that the knives 177 and 174 of the companion cutters are arranged or displaced 90° from each other and that there is an overlap in the cut of the knives without interference.

What is claimed is:

1. A mower-conditioner harvester comprising a frame and at least one pair of reversely rotating mowing units arranged transversely of the harvester on the frame and rotatable about forwardly and upwardly inclined axes and having peripheral cutting means operative to cut forage crops thereahead in a predetermined plane and having means disposed entirely radially inwardly of the cutting means to convey the cut crops and propel them in a predetermined trajectory rearwardly and including conveying surfaces transversely sloping with respect to said axes and projecting diagonally away from said axes, and cooperatively arranged conditioning rollers on the frame spaced rearwardly from said mowing units in alignment with the trajectory of the cut forage crops from said surfaces and having a forwardly directed intake nip disposed generally in alignment with said trajectory and in direct receiving relation to the cut crops, said rollers operative to discharge the crops rearwardly and including a lower roller extending below the cutting plane of the mower units.

2. The invention according to claim 1 and said mowing units each comprising an upwardly extending drum, the drums of the pair of units defining a forwardly directed intake nip adapted to receive cut material therebetween and pursuant to rotation of the drums to draw the material between the drums and discharge the material rearwardly.

3. The invention according to claim 1 and said conditioning rollers oriented in substantially parallel relation on horizontal axes.

4. The invention according to claim 1 and means adjustably mounting said units for changing the position of said axes.

5. The invention according to claim 1 and a platform extending between said units and said rollers which are oriented substantially horizontally for guiding the material directly into the rollers.

6. A mower-conditioner harvester comprising at least one pair of reversely rotating mowing units arranged transversely of the harvester and rotatable about upright axes and having peripheral cutting means operative to cut forage crops thereahead in a predetermined plane and having means disposed entirely radially inwardly of the cutting means to convey the cut crops and propel them in a predetermined trajectory rearwardly, and cooperatively arranged conditioning rollers spaced rearwardly from said mowing units in alignment with the trajectory of the cut forage crops and having a forwardly directed intake nip disposed generally in alignment with said trajectory and in receiving relation to the cut crops, said rollers operative to discharge the crops rearwardly, and a platform mounted on said frame and disposed on a generally horizontal axis, and means for adjusting the inclination of the platform about said axis to provide a guide surface from the mowing units to said rollers.

7. The invention according to claim 2 and each drum comprising an outwardly extending vane for engaging the cut material and slinging it rearwardly.

8. A mower-conditioner harvester comprising at least one pair of reversely rotating mowing units arranged transversely of the harvester and rotatable about upright axes and operative to cut forage crops thereahead in a predetermined plane and having means to convey the cut crops and propel them in a predetermined trajectory rearwardly, and cooperatively arranged conditioning rollers spaced rearwardly from said mowing units in alignment with the trajectory of the cut forage crops and having a forwardly directed intake nip disposed in receiving relation to the cut crops and operative to discharge the crops rearwardly, and said mowing units each comprising an upwardly extending drum, the drums of the pair of units defining a forwardly directed intake nip adapted to receive cut material therebetween and pursuant to rotation of the drums draw the material between the drums and discharge the material rearwardly, and each drum comprising an outwardly extending vane for engaging the cut material and slinging it rearwardly, and each vane having a wide lower portion and tapered upwardly to a narrow upper portion.

9. The invention according to claim 3 and one of said rollers being an upper roller and the other being a lower roller and the axis of said upper roller being disposed in advance of the lower roller and said nip facing downwardly and forwardly.

10. The invention according to claim 9 and said rollers discharging crops in an upward trajectory, and means for fluffing the crushed crops discharging from said rollers disposed atwarth the trajectory of such crushed crops for impingement thereby.

11. A mower conditioner comprising a frame, mowing means comprising a plurality of pairs of rotary swinging knife mowers operating in a common plane rotatably supported from the frame for rotation about upright axes for cutting the crops and having means for discharging the cut crops forcibly rearwardly, generally horizontally disposed upper and lower hay conditioning rollers spaced rearwardly of said mowing means and extending from one end thereof to the other and rotatable to receive the cut crops directly from said mowing means and to crush the crops and discharge the crops rearwardly, and said rollers defining a forwardly facing intake nip and a platform extending from adjacent to the rear of said mowing means to said intake nip for guiding cut crop material thereto, and means for adjusting said platform to vary the position and inclination thereof with reference to said rollers and said mowing means to provide optimum guidance of material from the latter to the former.

12. The invention according to claim 11 and said mowers each comprising a generally cylindrical drum, a conical peripheral shield projecting from the lower end of the drum, and a plurality of knife blades swingably mounted about the shield and projecting outwardly of the periphery thereof, and means for driving the rotary mowers in timed relation with each other.

13. The invention according to claim 12 and each drum comprising at least one chordal surface area in the respective cylinder, and a paddle extending outwardly from said surface area for engaging the crop material cut by the related mower and slinging the material rearwardly.

14. The invention according to claim 1 and at least certain of said units each comprising a crop conveying upper surface extending normal to the axis of rotation of the respective unit.

15. The invention according to claim 14 and other pairs of mowing units arranged in alignment with said pair transversely of the direction of traverse of the harvester and comprising end units each having a generally frustoconical upper portion with outwardly directed cropengaging paddles.

16. The invention according to claim 1 and said mowing units each comprising a shaft, a support mounted on the frame beneath said units and means in the support for rotating the respective shafts.

17. The invention according to claim 1 and a hollow support mounted on the frame above said units, and each unit comprising a shaft, and means in the support for driving the shafts.

18. The invention according to claim 1 and means mounted on the frame for bending the crops ahead of the mowing units to present the crops butt ends first thereto and a cover extending from said means over said units.

19. The invention according to claim 5 and said platform having a forward edge spaced rearwardly from said mowing units and defining a gap therewith for discharging dirt and the like therethrough.

* * * * *